(12) United States Patent
Krasovskiy et al.

(10) Patent No.: US 10,381,127 B2
(45) Date of Patent: Aug. 13, 2019

(54) SATURATED-DIMER-ACID-DIESTER DIELECTRIC FLUID

(71) Applicant: Dow Global Technologies LLC, Midland, MI (US)

(72) Inventors: Arkady L. Krasovskiy, Freeport, TX (US); Paul J. Caronia, Annadale, NJ (US)

(73) Assignee: Dow Global Technologies LLC, Midland, MI (US)

( * ) Notice: Subject to any disclaimer, the term of this patent is extended or adjusted under 35 U.S.C. 154(b) by 206 days.

(21) Appl. No.: 15/316,295

(22) PCT Filed: May 27, 2015

(86) PCT No.: PCT/US2015/032521
§ 371 (c)(1),
(2) Date: Dec. 5, 2016

(87) PCT Pub. No.: WO2015/199867
PCT Pub. Date: Dec. 30, 2015

(65) Prior Publication Data
US 2017/0194070 A1 Jul. 6, 2017

Related U.S. Application Data

(60) Provisional application No. 62/017,309, filed on Jun. 26, 2014.

(51) Int. Cl.
*H01B 3/20* (2006.01)
*C09K 5/10* (2006.01)

(52) U.S. Cl.
CPC ........ *H01B 3/20* (2013.01); *C09K 5/10* (2013.01)

(58) Field of Classification Search
CPC .................................................... H01B 3/20
See application file for complete search history.

(56) References Cited

U.S. PATENT DOCUMENTS

| | | | | |
|---|---|---|---|---|
| 8,268,199 | B1* | 9/2012 | Forest | C10M 105/42 252/570 |
| 2007/0275864 | A1* | 11/2007 | Nelson | C08L 67/00 508/235 |
| 2009/0036337 | A1* | 2/2009 | Deskin | C10M 159/04 508/279 |
| 2009/0194748 | A1 | 8/2009 | Rapp et al. | |
| 2013/0200299 | A1* | 8/2013 | Mazyar | E21B 43/128 252/75 |
| 2013/0225023 | A1* | 8/2013 | Qiu | C07C 69/58 442/117 |
| 2013/0255023 | A1 | 10/2013 | Kikuta et al. | |
| 2017/0194070 | A1* | 7/2017 | Krasovskiy | C09K 5/10 |

FOREIGN PATENT DOCUMENTS

| | | | | |
|---|---|---|---|---|
| CA | 2869867 | A1 | 10/2013 | |
| CA | 2952019 | A1 * | 12/2015 | ....... H01B 3/20 |
| WO | 2002/088208 | A2 | 11/2002 | |

OTHER PUBLICATIONS

McShance, C. Patrick, "Natural and Synthetic Ester Dielectric Fluids: Their Relative Enivironmental, Fire Safety, and Electrical Performance" Industrial & Amp; Commerical Power Systems Technical Conference, 1999, Sparks, Nevada.
Pine Chemicals Association Inc., "High Production Volume Chemical Challenge Program: Final Submission for Fatty Acid Dimers and Trimer" Dec. 2004.
PCT/US2015/032521, International Search Report and Written Opinion dated Aug. 21, 2015.
PCT/US2015/032521, International Preliminary Report on Patentability dated Jan. 5, 2017.

* cited by examiner

*Primary Examiner* — Nicole M. Buie-Hatcher
*Assistant Examiner* — M. Reza Asdjodi

(57) ABSTRACT

Dielectric fluid comprising one or more saturated diesters of dimer acids. Such dielectric fluids can also comprise one or more additives such as antioxidants, oxidation inhibitors, corrosion inhibitors, metal deactivators, pour point depressants, or combinations thereof. Additionally, various embodiments concern an electrical device or component comprising a dielectric fluid containing one or more saturated diesters of dimer acids.

10 Claims, No Drawings

SATURATED-DIMER-ACID-DIESTER DIELECTRIC FLUID

REFERENCE TO RELATED APPLICATIONS

The present application claims the benefit of U.S. Provisional Application No. 62/017,309, filed on Jun. 26, 2014.

FIELD

Various embodiments of the present invention relate to saturated diesters of dimer acids and their use as dielectric fluids.

INTRODUCTION

Dielectrics are non-conducting fluids used in a variety of applications. The insulation and cooling properties of dielectric fluids find use in electrical components such as transformers, capacitors, switching gears, transmission components, distribution components, switches, regulators, circuit breakers, autoreclosers, fluid-filled transmission lines, and other electrical apparatuses.

In a transformer, the dielectric fluid provides coolant and insulating properties to the internal transformer components. The dielectric fluid cools the transformer and also provides part of the electrical insulation between internal live parts. Requirements for dielectric fluid are a long operating life (10-20 years) and stability at high temperatures for an extended period.

Polychlorinated biphenyl compounds (also known as "PCB's"), once used as dielectric fluid in transformers, have been phased out due to their toxic properties and negative environmental impact. Non-toxic transformer oils that have replaced PCB's include silicone-based or fluorinated hydrocarbon oils, mineral oils, fatty acid esters, vegetable-based oils and vegetable seed oils. These non-toxic oils can have drawbacks regarding viscosity, flash point, fire point, pour point, water saturation point, dielectric strength and/or other properties limiting their usefulness as dielectric fluids.

SUMMARY

One embodiment is a dielectric fluid, comprising a saturated dimer acid diester.

DETAILED DESCRIPTION

Various embodiments of the present invention concern saturated diesters of dimer acids and their use in dielectric fluids. Such dielectric fluids can optionally contain additional components, such as antioxidants, oxidation inhibitors, corrosion inhibitors, metal deactivators, pour point depressants, or combinations thereof. Additionally, various embodiments concern an electrical component comprising a dielectric fluid containing one or more saturated diesters of dimer acids.

Saturated Dimer Acid Diesters

As noted above, the dielectric fluids described herein comprise one or more saturated diesters of dimer acids. As used herein, the term "dimer acid" denotes dicarboxylic acids prepared by dimerizing unsaturated fatty acids. The resulting dimer acid, if not already saturated, can be hydrogenated to create a saturated molecule. As known in the art, the term "saturated" denotes a molecule having neither carbon-carbon double bonds nor carbon-carbon triple bonds. Suitable fatty acid starting materials for producing the dimer acid include, but are not limited to, unsaturated C18 fatty acids such as, for example, oleic acid. In various embodiments, the starting fatty acid material can be a complex mixture of fatty acids such as found in tall oil, for example.

Dimerization of the fatty acid starting materials can be accomplished using known methods in the art. For instance, in one embodiment, dimerization can be accomplished by heating the unsaturated fatty acids (e.g., tall oil fatty acids) in the presence of an acid-treated clay catalyst to a temperature greater than 200° C. Under these conditions, some of the fatty acids dimerize, a lesser amount trimerize, and some isomerize to monomer. The resulting mixture is called crude dimer. The crude dimer can then be distilled to separate unsaturated dimer from monomer, and the unsaturated dimer can be further distilled to separate out any trimer content. The distilled unsaturated dimer can then be hydrogenated to produce the saturated dimer acid suitable for use herein.

When a complex mixture of fatty acids is used as the starting unsaturated fatty acid material, the resulting dimerized fatty acid can be a mixture of various dimer acids. Such a mixture of dimerized fatty acids can include (after hydrogenation), for example, dimer acids having one or more of the following structures:

Acyclic dimer:

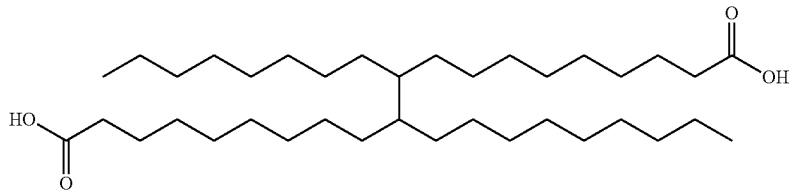

Cyclic dimer:

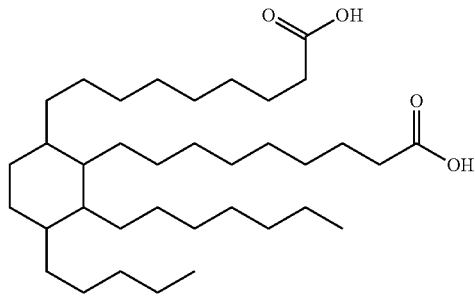

Polycyclic dimer:

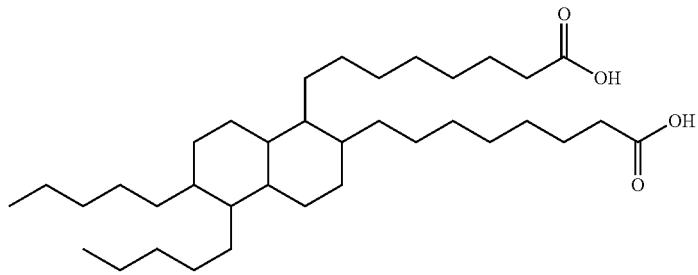

In various embodiments, commercially available saturated (e.g., hydrogenated) dimer acids may be employed. An example of a suitable commercially available saturated dimer acid includes, but is not limited to, hydrogenated dimer acid, CAS No. 68783-41-5, having an average number-average molecular weight ("$M_n$") of about 570 g/mol, available from Sigma-Aldrich, St. Louis, Mo.

The dimer acid diesters suitable for use herein can be prepared by known esterification techniques of the saturated dimer acids, such as those described above, with one or more alcohols. In various embodiments, the esterification reaction can be performed with catalysts, such as acids and/or bases. Alternatively, esterification can be performed at elevated temperatures in the absence of catalysts. Additionally, the esterification reaction can be performed with or without a solvent at ambient or reduced pressure. Alternatively, a solvent (e.g., benzene or toluene) can be used as a carrier for azeotropic esterification.

Suitable alcohols used in the esterification reaction can be primary alcohols, secondary alcohols, tertiary alcohols, or mixtures thereof. Examples of suitable alcohols include, but are not limited to, ethanol, 1-propanol, 1-butanol, 1-pentanol, 2-ethylhexanol, iso-propanol, methyl isopropyl carbinol, and mixtures of two or more thereof.

The resulting saturated dimer acid diester can be a dialkyl diester of the saturated dimer acid. In various embodiments, the saturated dimer acid diester can be selected from the group consisting of a di-2-ethylhexyl diester of a dimer acid, a dihexyl diester of a dimer acid, a dibutyl diester of a dimer acid, a dipentyl diester of a dimer acid, and combinations of two or more thereof.

In various embodiments, the one or more saturated diesters of dimer acids can constitute at least 10 weight percent ("wt %"), at least 25 wt %, at least 50 wt %, at least 75 wt %, at least 95 wt % or at least 99 wt % of the dielectric fluid based on the entire weight of the dielectric fluid.

Additives

As noted above, the dielectric fluid can contain one or more additives in addition to the dimer acid diesters. Such additives include, but are not limited to, antioxidants, oxidation inhibitors, corrosion inhibitors, metal deactivators, pour point depressants, or combinations of two or more thereof.

In one or more embodiments, the dielectric fluid comprises one or more antioxidants. Antioxidants can improve the oxidative stability of the dielectric fluid. In an embodiment, the antioxidant is a phenolic antioxidant or an amine antioxidant. Non-limiting examples of suitable phenolic antioxidants include IRGANOX™ L 64, IRGANOX™ L 94; VANOX™ MBPC (2,2'-methylene-bis(4-methyl-6-tert-butylphenol)), IRGANOX™ L 109 (bis(3,5-di-tert-butyl-4-hydroxyhydrocinnamate), di-tert-butyl-para-cresol, 2,6-di-tert-butyl-methyl phenol, 2,4-dimethyl-6-tert-butyl phenol, and any combination thereof.

Non-limiting examples of amine antioxidants include N,N'dioctyldiphenylamine, di-β-naphtyl-para-phenylenediamine, IRGANOX™ L 57 (octylated/butylated diphenylamine), NAUGALUBE™ 438L (nonylated diphenylamine), butyl octyl diphenyl amine, IRGANOX™ L 74 (dialkyl diphenylamine), dicumyl diphenyl amine, N,N'-di-isopropyl-para-phenylenediamine, N,N'-bis-(1,4-dimethylphenyl)-para-phenylenediamine, and any combination thereof.

Further non-limiting examples of suitable antioxidants include butylated hydroxy toluene (BHT), butylated hydroxy anisole (BHA), mono-tertiary butyl hydro quinone (TBHQ), and any combination thereof.

Still further non-limiting examples of suitable antioxidants include 2,2-di(4-hydroxyphenyl) propane, phenolthiazine, phenolthizazine carboxylic esters, polymerized trimethyldihydroquinoline, phenyl-α-naphtylamine, N,N'dioctyldiphenylamine, N,N'-diisopropyl-p-phenyldiamine, dibutyl cresol, butylated hydroxyanisoles, anthraquinone, quinoline, pyrocatechol, di-β-naphtyl-para-phenylenediamine, propylgallate, 1,3,5-trimethyl-2,4,6-tris(3,5-di-tert-butyl-4-hydroxybenzyl)benzene, tris(2,4-ditert-butylphenyl) phosphite, bis(1,2,2,6,6-pentamethyl-4-piperidyl) sebacate, tetrakis[methylene(3,5-di-t-butyl-4-hydroxyhydrocinnamate)]methane, thiodiethylene bis(3,5-di-tert-butyl-4-hydroxyhydrocinnamate, 4,4'-thiobis(6-tert-butyl-m-cresol), 2,2'-thiobis(6-t-butyl-4-methylphenol), 2,2'-methylenebis(4-methyl-6-tert-butylphenol), benzenamine, 4-(1-methyl-1-phenylethyl)-N-4[4-(1-methyl-1-phenylethyl) phenyl]-, taxilic acid, citric acid, and any combination of the foregoing.

When an antioxidant is employed, the dielectric fluid can contain from 0.1 to 1.0 wt % or 1.5 wt % antioxidant, based on the entire weight of the dielectric fluid.

As noted above, the dielectric fluid can include one or more metal deactivators. Metal deactivators can improve the oxidative stability of the dielectric fluid. Non-limiting examples of suitable metal deactivators include copper deactivator and aluminum deactivator. Copper has a catalytic effect in the oxidation of oil. The antioxidants react with free oxygen thereby preventing the latter from attacking the oil. A copper deactivator such as benzotriazole derivatives reduces the catalytic activity of copper in the dielectric fluid. In an embodiment, the dielectric fluid contains less than 1 wt % of a copper deactivator. IRGAMET 30 is a commercially available metal deactivator from CIBA SPECIALTY CHEMICALS and is a triazole derivative, N,N-bis(2-Ethylhexyl)-1H-1,2,4-triazole-1 methanamine.

Non-limiting examples of other suitable metal deactivators include 2',3-bis[[3-[3,5-di-tert-butyl-4-hydroxyphenyl]propionyl]]proponiohydrazine, benzo-triazole fatty amine salt, 1-(di-isooctylaminomethyl)-1,2,4-triazole, 1-(2-methoxyprop-2-yl)tolyltriazole, 1-(1-cyclohexyloxypropyl)tolyltriazole, 1-(1-cyclohexyloxyheptyl)tolyltriazole, 1-(1-cyclohexyloxybutyl)tolyltriazole, 1-[bis(2-ethylhexyl)aminomethyl-4-methylbenzotriazole, triethyl borate, tripropyl borate, triisopropyl borate, tributyl borate, tripentyl borate, trihexyl borate, tricyclohexyl borate, trioctyl borate, triisooctyl borate, and N,N-bis(2-Ethylhexyl)-ar-methyl-1H-benzotriazole-1-methanamine.

When a metal deactivator is employed, the dielectric fluid can include 0.1 wt % to less than 0.7 wt %, or less than 1.0 wt % metal deactivator, based on the total weight of the dielectric fluid.

As noted above, the dielectric fluid can comprise one or more pour point depressants. Non-limiting examples of suitable pour point depressants include methacrylic acid ester, polyalkyl methacrylate, fatty acid alkyl esters from fatty acids, polyvinyl acetate oligomers, acrylic oligomers, VISCOPLEX™ 10-310, VISCOPLEX™ 10-930, and VISCOPLEX™ 10-950. In an embodiment, the pour point depressant is a polymethacrylate (PMA).

In an embodiment, the pour point may be further reduced by winterizing the dielectric fluid. "Winterization" is the process of removing sediment which appears in the dielectric fluid at low temperatures. The sedimentation is accompanied with a decrease in the oil's viscosity. Winterization may be performed by reducing the temperature serially to 5° C., 0° C. and −12° C. for several hours, and filtering the solids with diatomaceous earth.

Properties

The present dimer acid diesters can have specific physical properties which makes them suited for use as a dielectric fluid.

The flash point for the present dimer acid diesters can be at least 250° C., at least 275° C., or at least 300° C., as measured in accordance with ASTM D 92. In various embodiments, the flash point of the dimer acid diesters can be in the range of from 250° C. to 350° C., from 300° C. to 325° C., or from 306° C. to 312° C., as measured by ASTM D 92. Furthermore, the flash point for the present dielectric fluid as a whole can be at least 250° C., at least 275° C., or at least 300° C., as measured in accordance with ASTM D 92. Additionally, the flash point of the dielectric fluid as a whole can be in the range of from 250° C. to 350° C., from 300° C. to 325° C., or from 306° C. to 312° C., as measured by ASTM D 92.

The fire point temperature for the present dimer acid diesters can be at least 300° C., at least 320° C., or at least 340° C., as measured in accordance with ASTM D 92. In various embodiments, the fire point of the dimer acid diesters can be in the range of from 300 to 400° C., from 320 to 380° C., or from 337 to 350° C. Furthermore, the fire point temperature for the present dielectric fluid as a whole can be at least 300° C., at least 320° C., or at least 340° C., as measured in accordance with ASTM D 92. Additionally, the fire point of the dielectric fluid as a whole can be in the range of from 300 to 400° C., from 320 to 380° C., or from 337 to 350° C.

The pour point for the present dimer acid diesters can be less than −10° C., less than −15° C., less than −20° C., less than −30° C., or less than −40° C., as measured in accordance with ASTM D 97. In various embodiments, the dimer acid diesters can be pourable at −40° C. Furthermore, The pour point for the present dielectric fluid as a whole can be less than −10° C., less than −15° C., less than −20° C., less than −30° C., or less than −40° C., as measured in accordance with ASTM D 97. In various embodiments, the dielectric fluid as a whole can be pourable at −40° C.

The present dielectric fluid can have an initial water content less than 200 ppm, or from 0 ppm, or 10 ppm, to 100 ppm, or less than 200 ppm as measured in accordance with ASTM D 1533.

The present dielectric fluid can be free, void, or otherwise devoid of polychlorinated biphenyls ("PCB"). In other words, the amount of PCB (if any) present in the dielectric fluid is not detectable by way of ASTM D 4059.

In an embodiment, the present dielectric fluid can have a viscosity less than about 50 cSt at 40° C. and less than 15 cSt at 100° C. as measured in accordance with ASTM D 445 (Brookfield).

The present dielectric fluid may have any combination of the foregoing properties.

Device

The present disclosure provides a device. The device includes an electrical component and the present dielectric fluid is in operative communication with the electrical component. The present dielectric fluid includes one or more of the diesters of dimer acids described above and optionally one or more additives, such as an antioxidant. Non-limiting examples of suitable electrical components include a transformer, a capacitor, a switching gear, a transmission component, a distribution component, a switch, a regulator, a circuit breaker, an autorecloser, or like components, a fluid-filled transmission line, and/or combinations thereof.

When used in a device, the dielectric fluid can be in operative communication with the electrical component. As used herein, "operative communication" is a configuration and/or a spatial relationship enabling the dielectric fluid to cool and/or insulate the electrical component. Operative communication thereby includes direct and/or indirect contact between the dielectric fluid and the electrical component by way of the following configurations: dielectric fluid in, on, around, adjacent to, contacting, surrounding (wholly or partially) through, and/or in proximity to the electrical component; and the electrical component immersed (wholly or partially) in the dielectric fluid.

In an embodiment, the electrical component includes a cellulose-based insulation material. Non-limiting examples of suitable cellulose-based insulation material include kraft paper and/or pressboard.

In an embodiment, the electrical component is a transformer. The present dielectric fluid comprising one or more dimer acid diesters can be in operative communication with the transformer. In the transformer, the present dielectric fluid provides (1) a liquid coolant that dissipates heat energy generated by the transformer operation and/or (2) an insulator between internal live parts that prevents electrical components from contacting or arcing over the transformer. The dielectric fluid can be present in an effective amount to insulate the electrical component.

In an embodiment, the transformer can be a distribution transformer. A distribution transformer includes primary and secondary coils or windings in a housing or a tank and a dielectric fluid in the tank in operative communication with the windings. The windings are insulated from each other, via the dielectric fluid, and are wound around a common core of magnetically suitable material, such as iron or steel. The core and/or the windings may also have laminations, insulation coatings or insulation paper materials to further insulate and absorb heat. The core and windings can be immersed in the dielectric fluid, allowing free circulation of the fluid. The dielectric fluid covers and surrounds the core and windings. The dielectric fluid can completely fill all small voids in the insulation and elsewhere within the housing. The transformer housing provides an air-tight and fluid-tight seal around the tank preventing ingress of air and/or contaminants which may collect and eventually cause failure of the transformer. A distribution transformer has a system voltage typically in the range of 36 kV or less.

In an embodiment, the electrical component is a power transformer. A power transformer typically has a system voltage in the range of 36 kV or greater.

In order to improve the rate of heat transfer from the core and coil assembly, the transformer may include additional structures for providing increased cooling, such as fins on the tank that are provided to increase the surface area available to provide cooling, or radiators or tubes attached to the tank that are provided so that the hot fluid that rises to the top of the tank may cool as it circulates through the tubes and returns at the bottom of the tank. These tubes, fins or radiators provide additional cooling surfaces beyond those provided by the tank walls alone. Fans may also be provided to force a current of air to blow across the heated transformer enclosure, or across radiators or tubes to better transfer the heat from the hot dielectric fluid and heated tank to the surrounding air. Also, some transformers include a forced oil cooling system which includes a pump to circulate the dielectric fluid from the bottom of the tank through pipes or radiators to the top of the tank (or from the tank to a separate and remote cooling device and then back to the transformer).

Other embodiments are also possible and are not limited to use in a transformer.

In an embodiment, the present disclosure provides a process that includes placing the present dielectric fluid in operative communication with an electrical component. The dielectric fluid is the present dielectric fluid containing one or more dimer acid diesters and optionally one or more additives, such as an antioxidant. The process further includes cooling or insulating the electric component with the present dielectric fluid. The electrical component may include any one of a transformer, a capacitor, a switching gear, a power cable, a distribution component (such as an oil-filled distribution cable), a switch, a regulator, a circuit breaker, an autorecloser, fluid-filled transmission line, and/or combinations thereof.

Test Methods

Flash Point

Flash point is determined according to ASTM D92.

Fire Point

Fire point is determined according to ASTM D92

Pourability at −40° C.

An eight-dram clear-glass vial (Fisher Scientific, 25×95 mm 8 dram vial part 03-339-22H) is filled approximately half way with fluid. The fluid-containing vial is then conditioned for 24 hours in a −40° C. freezer (Cincinnati sub-zero model WU-24-2-2-SC/AC). After 24 hours, the specimen is removed from the freezer. Its flowability is visually characterized for 5 to 10 minutes after removal from the freezer. The flowability characterization consists of turning the vial onto its side and describing if the material flowed/poured and its appearance.

Materials

The following materials are employed in the Examples, below.

The saturated dimer acid is hydrogenated dimer acid, CAS No. 68783-41-5, having an average $M_n$ of about 570 g/mol, which is commercially available from Sigma-Aldrich, St. Louis, Mo., USA.

The unsaturated dimer acid, having the CAS No. 61788-89-4, is commercially available from BOC Sciences, Shirley, N.Y., USA.

N-Butanol is commercially available from Sigma-Aldrich, St. Louis, Mo., USA.

2-Ethylhexanol is commercially available from Sigma-Aldrich, St. Louis, Mo., USA.

1-Hexanol is commercially available from Sigma-Aldrich, St. Louis, Mo., USA.

1-Pentanol is commercially available from Sigma-Aldrich, St. Louis, Mo., USA.

Sulfuric acid is commercially available from Sigma-Aldrich, St. Louis, Mo., USA.

Toluene is commercially available from Sigma-Aldrich, St. Louis, Mo., USA.

MIDEL™ 7131 is a synthetic ester that is a tetraester of pentaerythritol and is commercially available from M&I Materials, Manchester, United Kingdom.

EXAMPLES

Example 1—Preparation of Dimer Acid Diesters

Prepare four saturated dimer acid diesters (S1-S4) and two unsaturated dimer acid diesters (CS2 and CS3) according to the following procedure. Load alcohol (1 mol), toluene (100 mL), dimer acid (0.45 mol), and $H_2SO_4$ (conc., 1 mol %) into a flask. Sample S1 is prepared using 2-ethylhexanol as the alcohol, Sample S2 is prepared using 1-hexanol as the alcohol, Sample S3 is prepared using 1-butanol as the alcohol, and Sample S4 is prepared using 1-pentanol as the alcohol. Samples S1-S4 are prepared using the saturated dimer acid. Comparative Sample CS2 is prepared using 1-butanol as the alcohol, and Comparative Sample CS3 is prepared using 2-ethylhexanol as the alcohol. CS2 and CS3 are prepared using the unsaturated dimer acid.

The resulting mixture is refluxed with azeotropic distillation of water using a Dean-Stark setup. Allow the reaction to run until no more water is separated (approximately 5 hours). Evaporate excess of toluene and alcohol to yield the dimer acid diester. Thereafter, the obtained dimer acid diester is neutralized by stirring for five hours at room temperature with basic alumina. The basic alumina is filtered off to give corresponding neutralized dimer acid diesters.

Example 2—Fire, Flash, and Pour Point of Dielectric Fluids

Analyze Samples S1-S4, and Comparative Samples CS1-CS3, for fire point, flash point, and pour point according to the Test Methods described above. CS1 is MIDEL™ 7131.

TABLE 1

Properties of S1-S4 and CS1-CS3

| Sample | Flash Point (° C.) | Fire Point (° C.) | Pourability at −40° C. |
|---|---|---|---|
| S1 | 308 | 348 | Visual determination of liquid form and pourable at −40° C. |
| S2 | 310 | 346 | Visual determination of liquid form and pourable at −40° C. |
| S3 | 306 | 337 | Visual determination of liquid form and pourable at −40° C. |
| S4 | 312 | 350 | Visual determination of liquid form and pourable at −40° C. |
| CS1 | 264 | 302 | Visual determination of liquid form and pourable at −40° C. |
| CS2 | N/A* | 103 | Sample not pourable at −40° C.; consistency of vegetable shortening |

TABLE 1-continued

Properties of S1-S4 and CS1-CS3

| Sample | Flash Point (° C.) | Fire Point (° C.) | Pourability at −40° C. |
|---|---|---|---|
| CS3 | 266 | 277 | Sample not pourable at −40° C.; consistency of vegetable shortening |

*This sample was first tested with a starting temperature of 250° C., but this temperature was too high as the material ignited immediately with a temperature showing 227° C., so the testing was stopped. A subsequent test starting at 100° C. gave no flash point result, but did show a fire point at 103° C.

As can be seen from the results in Table 1, each of Samples S1-S4 exhibited higher flash points and fire points compared to CS1-CS3. Additionally, as with the conventional synthetic ester of CS1, all of Samples S1-S4 are pourable at −40° C., whereas CS2 and CS3, which are unsaturated dimer acid diesters, are not pourable at this temperature.

The invention claimed is:

1. A dielectric fluid, consisting of:
    a saturated dimer acid diester; and
    one or more additives selected from the group consisting of antioxidants, metal deactivators, pour point depressants, and combinations of two or more thereof;
    wherein the antioxidants are selected from the group consisting of phenolic antioxidants, amine antioxidants, anthraquinone, tris(2,4-ditert-butylphenyl) phosphite, and citric acid;
    wherein the metal deactivators are selected from the group consisting of benzotriazole derivatives, N,N-bis (2-Ethylhexyl)-1H-1,2,4-triazole-1 methanamine, 2',3-bis[[3-[3,5-di-tert-butyl-4-hydroxyphenyl]propionyl]] proponiohydrazine, benzo-triazole fatty amine salt, 1-(di-isooctylaminomethyl)-1,2,4-triazole, 1-(2-methoxyprop-2-yl)tolyltriazole, 1-(1-cyclohexyloxy-propyl)tolyltriazole, 1-(1-cyclohexyloxyheptyl)tolyltri-azole, 1-(1-cyclohexyloxybutyl)tolyltriazole, 1-[bis(2-ethylhexyl)aminomethyl-4-methylbenzotriazole,
    triethyl borate, tripropyl borate, triisopropyl borate, tributyl borate, tripentyl borate, trihexyl borate, tricyclohexyl borate, trioctyl borate, triisooctyl borate, and N, N-bis(2-Ethylhexyl)-ar-methyl-1H-benzotriazole-1-methanamine; and
    wherein the pour point depressants are selected from the group consisting of methacrylic acid ester, polyalkyl methacrylate, fatty acid alkyl esters from fatty acids, polyvinyl acetate oligomers, and acrylic oligomers.

2. A device comprising:
    an electrical component; and
    the dielectric fluid of claim 1.

3. The device of claim 2, wherein said electrical component is selected from the group consisting of a transformer, a capacitor, a switch, a regulator, a circuit breaker, a recloser, a fluid-filled transmission line, and combinations of two or more thereof.

4. The device of claim 2, wherein said electrical component is a transformer; wherein at least a portion of said dielectric fluid is disposed in said transformer.

5. The dielectric fluid of claim 1, wherein said saturated dimer acid diester has a flash point of at least 250° C. when measured according to ASTM D92; wherein said saturated dimer acid diester has a fire point of at least 300° C. when measured according to ASTM D92.

6. The dielectric fluid of claim 1, wherein said saturated dimer acid diester is a dialkyl diester of a saturated dimer acid.

7. The dielectric fluid of claim 1, wherein said saturated dimer acid diester is selected from the group consisting of a di-2-ethylhexyl diester of a dimer acid, a dihexyl diester of a dimer acid, a dibutyl diester of a dimer acid, a dipentyl diester of a dimer acid, and combinations of two or more thereof.

8. The dielectric fluid of claim 1, wherein said saturated dimer acid diester is pourable at −40° C.

9. The dielectric fluid of claim 1, wherein said dielectric fluid is free of trimer content.

10. The dielectric fluid of claim 1, wherein the saturated dimer acid diester constitutes at least 95 wt % of the dielectric fluid.

* * * * *